United States Patent Office 3,113,126
Patented Dec. 3, 1963

3,113,126
BENZOTHIAZOLYLMERCAPTO-4-ALKOXY-
CARBONYLPIPERAZINES
Richard O. Zerbe, Nitro, and John J. D'Amico, Charleston, W. Va., assignors to Monsanto Chemical Company, St. Louis, Mo., a corporation of Delaware
No Drawing. Filed June 22, 1959, Ser. No. 821,723
6 Claims. (Cl. 260—79.5)

The present invention relates to new chemical products as well as to means of obtaining such products and to the use of said products as accelerators of the vulcanization of rubber. More particularly, the invention relates to new unsymmetrical-1,4-substituted piperazines containing in one position a benzothiazolylmercapto radical and in the other position an alkoxy carbonyl radical, and to the use as disclosed of such products.

The prefered class of compounds most conveniently may be represented by the general formula

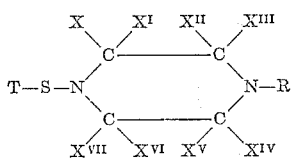

wherein T represents a benzothiazolyl group, R represents alkoxy carbonyl, and X, X$^I$, X$^{II}$, X$^{III}$, X$^{IV}$, X$^V$, X$^{VI}$ and X$^{VII}$ represent hydrogen or lower alkyl, at least four being hydrogen.

These compounds may be obtained by oxidative condensation of an N-alkoxy carbonyl substituted piperazine and a mercaptobenzothiazole. The required piperazines are for the most part known compounds and in any case are derivable by known procedures. Examples of the new compounds comprise 1-(2-benzothiazolylmercapto)-4-ethoxycarbonyl-2-
 methylpiperazine,
1-(2-benzothiazolylmercapto)-4-ethoxycarbonyl-2,5-
 dimethylpiperazine,
1-(2-benzothiazolylmercapto)-4-ethoxycarbonyl-2,3-
 dimethylpiperazine,
1-(2-benzothiazolylmercapto)-4-ethoxycarbonyl-2,2-
 dimethylpiperazine,
1-(2-benzothiazolylmercapto)-4-ethoxycarbonyl-2-
 ethylpiperazine,
1-(2-benzothiazolylmercapto)-4-ethoxycarbonyl-2,2,3-
 trimethylpiperazine,
1-(2-benzothiazolylmercapto)-4-ethoxycarbonyl-2,2-di-
 methyl-3-ethylpiperazine,
1-(2-benzothiazolylmercapto)-4-ethoxycarbonyl-2,2,3,
 3-tetramethylpiperazine,
1-(2-benzothiazolylmercapto)-4-methoxycarbonylpiper-
 azine,
1-(2-benzothiazolylmercapto)-4-isopropoxycarbonyl-
 piperazine,
1-(2-benzothiazolylmercapto)-4-propoxycarbonyl-
 piperazine,
1-(2-benzothiazolylmercapto)-4-butoxycarbonylpipera-
 zine,
1-(2-benzothiazolylmercapto)-4-isobutoxycarbonylpiper-
 azine and
1-(2-benzothiazolylmercapto)-4-amyloxycarbonylpiper-
 azine.

It is understood and is quite apparent that in place of 2-benzothiazolylmercapto other thiazolylmercapto radicals may be substituted, as for example substituted derivatives where the substituents comprise nitro, phenyl, lower alkoxy and lower alkyl radicals.

The preparation of the new compounds will be understood from the typical example that follows:

1-(2-Benzothiazolylmercapto)-4-Ethoxycarbonylpiper-
azine

A solution was prepared by mixing 41.8 parts (0.25 mole) of 99.8% mercaptobenzothiazole, 25 parts of water and 40 parts (0.25 mole) of 25% aqueous sodium hydroxide. The solution was stirred, while adding to it 158.2 parts (1.0 mole) of N-carbethoxy piperazine and then stirred for about 15 minutes. Over a period of about 15 minutes 42 parts of 25% sulfuric acid was added and the solution stirred for another 15 minutes. There was then slowly added over a period of one and one-half hours at 45–50° C. 0.3 mole of sodium hypochlorite in the form of an aqueous solution containing 17.5 grams NaOCl per 100 ml. The stirred reaction mixture was held at 45–50° C. for one hour longer and 4 parts of sodium sulfite added after cooling to 25° C. The product was extracted with ethyl ether, the ether solution washed with water until neutral to litmus and dried over sodium sulfate. After removing the ether in vacuo at a maximum temperature of 30° C., a solid product was obtained in 87.8% yield melting at 77–79° C. Upon recrystallization from dilute ethyl alcohol, it melted at 82–83° C. Analysis gave 13.0% nitrogen and 20.6% sulfur as compared to 13.0% nitrogen and 19.8% sulfur calculated for $C_{14}H_{17}N_3O_2S_2$.

As illustrative of the accelerating properties of the new compounds, a vulcanizable stock was compounded comprising

|  | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.5 |
| 1-(2-benzothiazolylmercapto)-4 - ethoxycarbonylpiperazine | 0.5 |

Vulcanization was completed at a temperature of 144° C. and the following results obtained on the stock:

| | |
|---|---|
| Modulus of elasticity at 300% elongation | 1880 |
| Tensile at break in lbs./in.$^2$ | 4000 |
| Mooney scorch at 135° C | 11.2 |

Examples of the present invention were also tested in a rubber stock containing a nitroso compound as a vulcanization retarder. The stock employed and test results obtained were as follows:

|  | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| N-nitrosodiphenylamine | 1.0 |
| Sulfur | 2.5 |
| Antioxidant | 1.5 |
| 1-(2-benzothiazolylmercapto)-4 - ethoxycarbonylpiperazine | 0.5 |
| Minutes cure at 144° C | 45 |

Test results follow:

| | |
|---|---|
| Modulus of elasticity at 300% elongation | 2080 |
| Tensile strength at break in lbs/in.$^2$ | 4260 |
| Mooney scorch at 121° C | 24.5 |

The data set forth above indicate that the products of the present invention display activity as vulcanization accelerators typical of the class of sulfenamide products. The products themselves, as was shown in the example, are easy to prepare, are relatively economical to obtain, possess good physical properties and also were found to exhibit good handling properties in rubber stocks and to show good stability on long continued storage. They accelerate vulcanization of any sulfur vulcanizable diene rubber. This class of rubbers contains a diene hydrocarbon in the polymer structure which contributes unsaturation and sulfur vulcanizability. They include styrene-butadiene copolymer rubbers, polybutadiene, natural rubber, synthetic polyisoprene. Delayed action accelerators are important for use in vulcanizing rubbers in which a diene hydrocarbon contributes a major proportion of the polymer but accelerate vulcanization of isobutylene polymerized in the presence of a small amount of a diene hydrocarbon (butyl rubber). The delayed action accelerator may be used alone or in combination with other accelerators, as for example diphenyl guanidine, di-o-tolyl guanidine and diphenyl guanidine phthalate. For most purposes the accelerators of the invention will be used in amounts within the range of 0.1–5% of the rubber.

It is intended to cover all changes and modifications of the examples of the invention herein chose for purposes of disclosure which do not constitute departures from the spirit and scope of the invention.

What is claimed is:

1. As a new product a compound having the structure

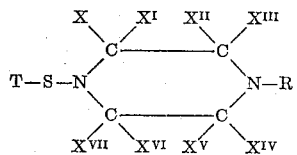

wherein T is a benzothiazolyl group, R is lower alkoxy carbonyl and $X$, $X^I$, $X^{II}$, $X^{III}$, $X^{IV}$, $X^V$, $X^{VI}$, and $X^{VII}$ are selected from the group consisting of hydrogen and lower alkyl, at least four being hydrogen.

2. As a new product a compound having the structure

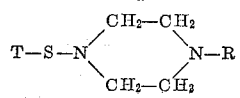

wherein T represents benzothiazolyl and R represents lower alkoxy carbonyl.

3. As a new product 1-(2-benzothiazolylmercapto)-4-ethoxycarbonylpiperazine.

4. The process of vulcanizing a sulfur vulcanizable hydrocarbon rubber which comprises heating at vulcanizing temperature rubber and sulfur in admixture with a small quantity sufficient to accelerate vulcanization of a product having the structure

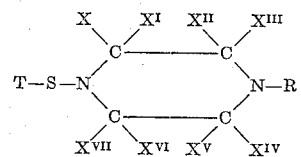

wherein T is a benzothiazolyl group, R is lower alkoxy carbonyl and $X$, $X^I$, $X^{II}$, $X^{III}$, $X^{IV}$, $X^V$, $X^{VI}$, and $X^{VII}$ are selected from the group consisting of hydrogen and lower alkyl, at least four being hydrogen.

5. The process of vulcanizing a sulfur vulcanizable hydrocarbon rubber which comprises heating at vulcanizing temperature rubber and sulfur in admixture with a small quantity sufficient to accelerate vulcanization of a product having the structure

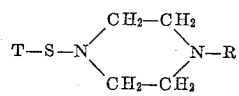

wherein T represents benzothiazolyl and R represents lower alkoxy carbonyl.

6. The process of vulcanizing a sulfur vulcanizable hydrocarbon rubber which comprises heating at vulcanizing temperature rubber and sulfur in admixture with a small quantity sufficient to accelerate vulcanization of 1-(2-benzothiazolylmercapto)-4-ethoxycarbonylpiperazine.

References Cited in the file of this patent

UNITED STATES PATENTS

| | | |
|---|---|---|
| 2,819,269 | Weston et al. | Jan. 7, 1958 |
| 2,852,498 | Bradley et al. | Sept. 16, 1958 |
| 2,879,262 | Sullivan | Mar. 24, 1959 |
| 2,906,754 | D'Amico | Sept. 29, 1959 |
| 2,909,524 | Dalalian et al. | Oct. 20, 1959 |